H. F. SCHMIDT.
CHANGE GEAR DEVICE.
APPLICATION FILED JUNE 19, 1916.

1,231,655.

Patented July 3, 1917.
2 SHEETS—SHEET 1.

Witness:

Inventor,
Hugo F. Schmidt,
By Hirsch & Hirsch
Attys.

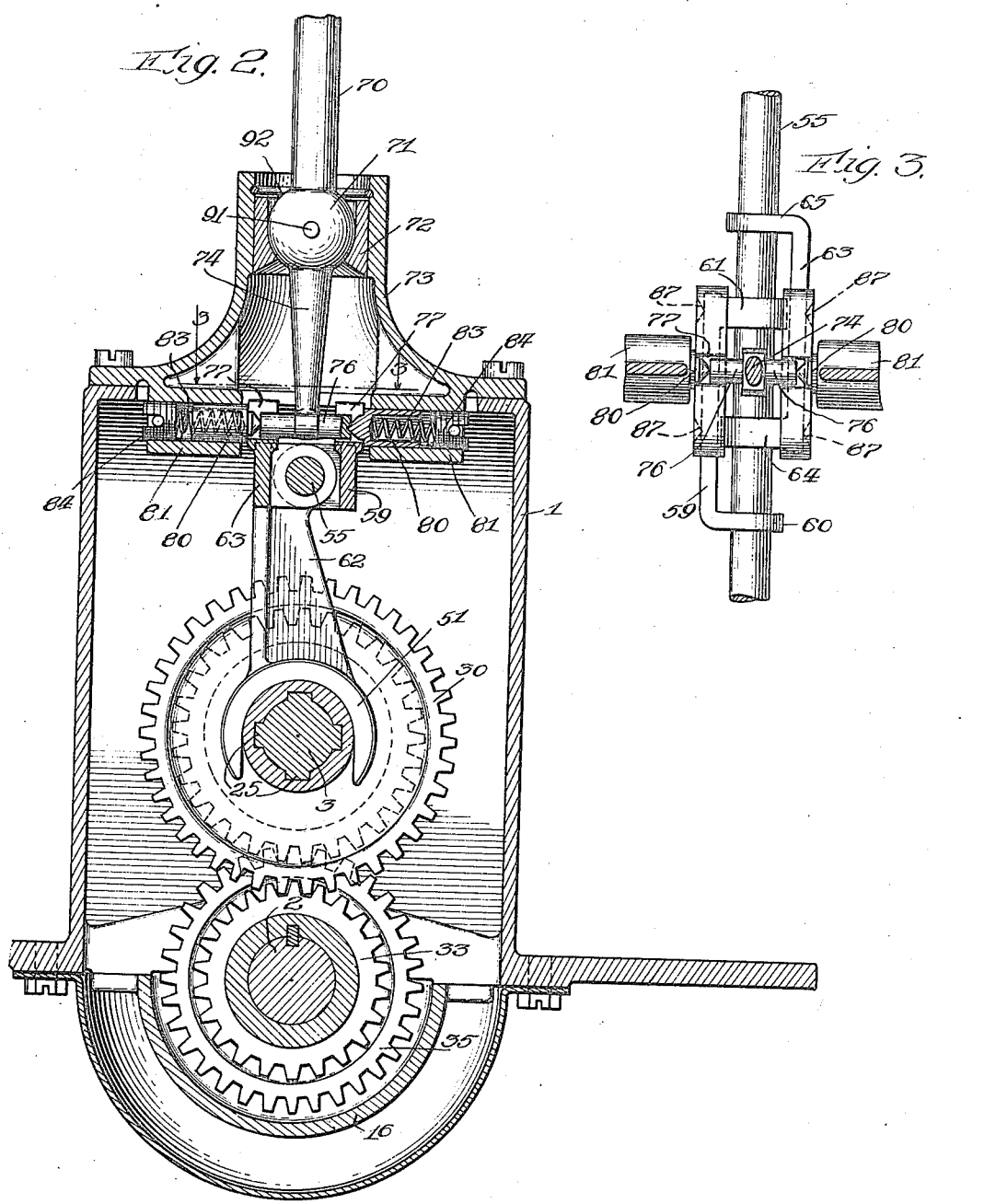

UNITED STATES PATENT OFFICE.

HUGO F. SCHMIDT, OF CHICAGO, ILLINOIS.

CHANGE-GEAR DEVICE.

1,231,655.  Specification of Letters Patent.  Patented July 3, 1917.

Application filed June 19, 1916. Serial No. 104,536.

*To all whom it may concern:*

Be it known that I, HUGO F. SCHMIDT, a citizen of the United States, residing in Chicago, in the county of Cook and State of Illinois, have invented certain new and useful Improvements in Change-Gear Devices, of which the following is a specification.

This invention relates to improvements in change-gear devices and more especially to that form of change-gear device comprising spur gears on parallel shafts, which are adapted by a sliding movement of some of them to be meshed and unmeshed according to the particular combination desired. Such a change-gear device is used quite generally in connection with an internal combustion engine in motor vehicles and is commonly called a "sliding-gear transmission," or a "sliding gear-set." The invention is here shown as embodied in a change-gear device of such form and is illustrated in the accompanying drawings in which:

Fig. 2 is a transverse vertical section on the line 2—2 of Fig. 1.

Fig. 3 is a horizontal section on the line 3—3 of Fig. 2.

Figure 1:
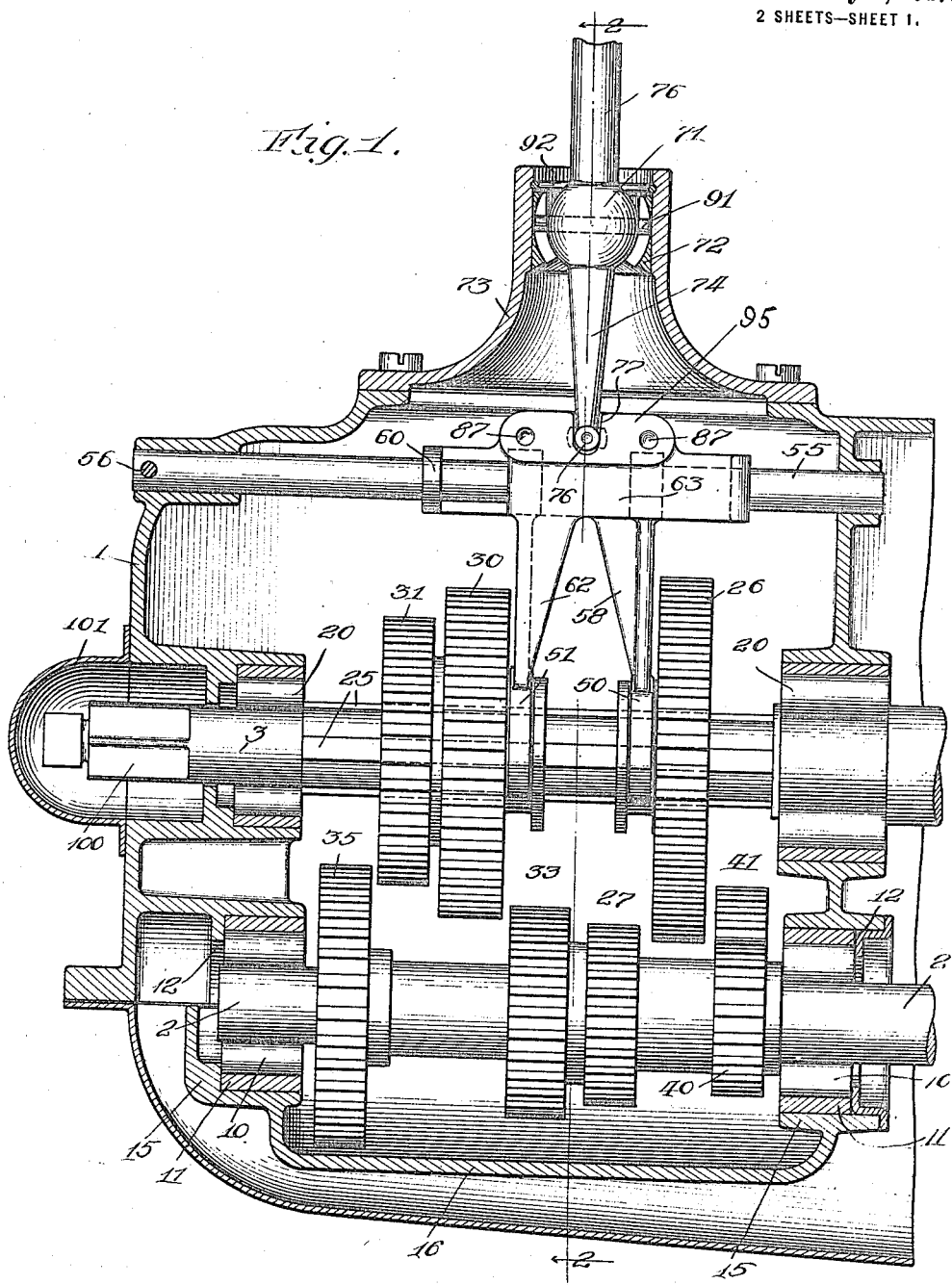
Figure 1 is a view of the complete change-gear device shown in vertical longitudinal section through its center.

As shown in said drawings the change-gear device comprises a suitably shaped housing 1, in which are arranged two parallel shafts, 2 and 3, the latter being journaled at their ends in the walls of the housing and being respectively as here shown, a driving shaft and a driven shaft. The driving shaft 2 is shown journaled at its ends on small rollers 10, which are arranged in bearing rings or race-ways 11; and the latter are fitted into semi-cylindric recesses 12—12 in the lower edges of two opposite walls of the housing 1, and are secured in place by inverted bearing caps 15, 15. These bearing caps 15 are made integral with a shallow bowl-shaped member 16, forming an oil or grease pan to confine the lubricant within the housing 1.

The driven shaft 3 is similarly journaled at its ends on rollers 20, which are likewise arranged in bearing rings or race-ways; and the latter are fitted into cylindric openings in the end walls of the housing 1.

On the shaft 2 are arranged four spur gears of different diameters, these gears being fixed non-rotatively to the shaft. On the shaft 3 are arranged corresponding gears adapted to mesh with the gears on the shaft 2, but the shaft 3 is made with four long splines 25 and the hubs of the gears on this shaft are made with corresponding keyways so that these gears may slide endwise on the shaft, but are non-rotative with respect thereto. The largest gear 26 on the shaft 3 is adapted to mesh with the smallest gear 27 on the shaft 2 to form the lowest gear combination or "first speed," as it is commonly termed, and the two gears 30 and 31 are adapted to slide together either into a position where the larger gear 30 meshes with a gear 33 on the driving shaft, or into a second position where the smaller of the two, 31, meshes with a gear 35 on the driving shaft, forming respectively the intermediate and the highest gear combination or the "second" and "third speeds," respectively. In addition the gear 26 is arranged to be driven by a gear 40 on the shaft 2 through an intermediate pinion 41 to form a reverse-gear combination when the gear 26 is slid into mesh with such pinion 41.

The gear 26 and the two gears 30 and 31 are shifted on the shaft 3 by shifting forks 50 and 51 respectively, which engage in grooves in the hubs of the gears, and these shifting forks are constructed as follows: Above the shaft 3 and parallel thereto is arranged a shaft 55 which is fitted at its ends into the walls of the housing 1, being fixed in position by a pin 56. The shifting fork 50 is made integral with a vertical shank 58, the upper end of which is extended to form a horizontal arm 59 in parallel relation to the shaft 55; the complete fork being shaped somewhat like an inverted letter L. At each end of the horizontal arm 59 are formed transverse flanges or projections 60 and 61 through which are openings to receive the shaft 55, so that the part may slide endwise upon the shaft. Similarly the fork 51 is made with a vertical shank 62 having at its upper end a horizontal arm 63, and at the ends of this arm are transverse flanges 64 and 65 respectively, with openings through them to receive the shaft 55, so that this part may likewise slide endwise on the shaft; but the two arms 59 and 63 are arranged in overlapping relation to each other so that the flange or projection 61 lies between the two projections on the part 63, and correspondingly one of the projections, 64, on the latter part lies between the two projections 60 and 61.

Above the gear housing 1 is arranged an upright shifting lever 70 which is fulcrumed near its lower end in such manner that it may be moved forward, backward and sidewise, being made with a large ball 71 journaled in a spherical opening in a socket-piece 72. This latter part is fitted into the neck of a bell-shaped cover 73 bolted upon the top of the gear housing. The lever 70 is prevented from twisting by a pin 91 which engages in radial grooves in the part 72; and the parts are held in place by a locking ring, 92, which is sprung into a circumferential groove in the neck of the part 73 above the socket-piece 72 to prevent the ball 71 from moving upward.

The two horizontal arms 59 and 63 of the shifting forks project above the plane of the shaft 55 in the form of two parallel ridges 95, with flat faces on their adjacent and opposite surfaces, and the shorter arm 74 of the gear shift lever extends downward below the ball joint into a position between these ridges where it is formed with two oppositely extending short thick pins 76. The pins 76 are adapted to engage in deep notches 77 in the ridges 95 when the lever is shifted to one side or the other, so that by the sidewise movements of the lever one of the shifting forks may be engaged and the other one released, or vice versa. Above and to each side of the shaft 55 are also arranged latches designed to engage in the same notches 77 and prevent the shifting forks from moving except when actuated by the shifting arm 74, each of these latches comprising a small latch bolt 80 which slides in a cylindric opening in a part 81 made integral with the bell-shaped cover 73. These latch bolts are pressed toward each other by springs 83 bearing against threaded plugs 84, and they are pointed at their inner ends and adapted to engage in the notches 77 from the sides of the ridges 95 opposite to the pins 76, so that when the two shifting forks are in their "neutral" position, with the gears out of mesh, the arm 74 will occupy a vertical position with the two shifting parts 59 and 63 latched by the latch-bolts 80 engaging in the notches; and the ends of these latch-bolts will likewise press against the ends of the pins 76 and yieldingly prevent the arm 74 from shifting sidewise. By pushing sidewise on the upper end of the lever 70 its lower end will be correspondingly displaced and one of the pins 76 will push the corresponding latch-bolt 80 out of engagement with its notch 77 and, being at the same time itself engaged in such notch, will permit the fork to be shifted forward or backward to make the desired gear combination; while the opposite fork is released and prevented from moving by its engaging latch as above described. At the completion of such forward and backward movement of either shifting fork the latter is held yieldingly in position for a correct meshing of the gears by the corresponding latch-bolt 80 entering a small depression 87 made in the outer face of the ridge 95 in line horizontally with the notch 77, while the pin 76 is kept in engagement with its notch by the narrowness of the space between the two ridges 95 which will prevent the arm 74 from moving sidewise except when the two notches 77 are opposite each other and the gears in their "neutral" position as shown.

I claim as my invention:

1. In a change-gear device the combination with a shaft having gears adapted to slide thereon, of another shaft having two parts arranged to slide endwise thereon and adapted to engage such gears to impart endwise movement thereto, openings in such sliding parts, a shifting lever adapted to engage in either opening to impart movement to one sliding part while permitting the other to remain stationary, and locking bolts adapted to engage in such openings.

2. In a change gear device, the combination with a shaft having gears adapted to slide thereon, of another shaft having two parts arranged to slide endwise thereon and adapted to engage such gears to impart endwise movement thereto, openings in such sliding parts, a shifting lever having its lower end arranged between the two sliding parts and having its lower part adapted to engage in either opening to impart movement to one sliding part while permitting the other to remain stationary, and locking bolts adapted to engage in the same openings in the sliding parts and adapted to be pushed out of engagement with the respective sliding parts by the engagement of the lower end of the shifting lever therein.

3. In a change-gear device the combination with a shaft and gears sliding thereon, of another shaft, two sliding members on such shaft in overlapping relation to each other, and a shifting lever arranged between such two sliding parts and adapted to engage with either one and to release the other one.

4. In a change-gear device the combination with a shaft and two sliding members thereon, of two shifting forks adapted to engage such sliding members, a single shaft supporting such shifting forks and means for actuating either fork independently of the other.

5. In a change-gear device the combination with a shaft having sliding members thereon, of another shaft with two shifting forks slidingly mounted thereon and adapted to engage such sliding members, and means for engaging either fork to impart movement thereto independently of the other.

6. In a change-gear device the combination with a shaft having gears adapted to slide thereon, of another shaft having two parts arranged to slide endwise thereon and adapted to engage such gears to impart endwise movement thereto, openings in such sliding parts, and a shifting lever adapted to engage in either opening to impart movement to one sliding part while permitting the other to remain stationary.

In witness whereof I have hereunto subscribed my name this 16th day of June, 1916.

HUGO F. SCHMIDT.